Oct. 23, 1962 K. D. SCHREYER 3,059,589
TROLLEY CONVEYOR SUSPENSION DEVICE
Filed Feb. 18, 1959
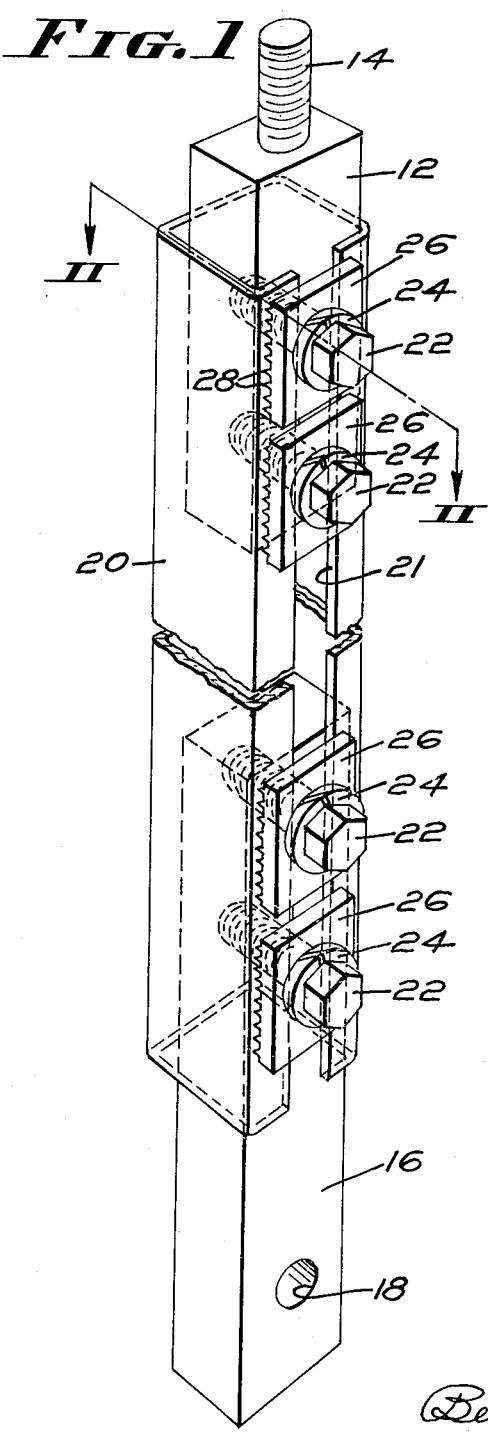
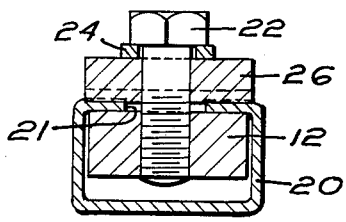
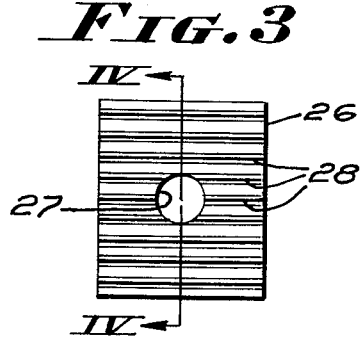
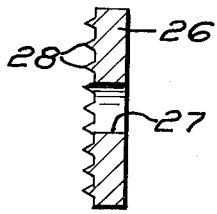
INVENTOR:
KENNETH D. SCHREYER
BY:
Beau, Brooks, Buckley & Beau,
ATTORNEYS.

United States Patent Office 3,059,589
Patented Oct. 23, 1962

3,059,589
TROLLEY CONVEYOR SUSPENSION DEVICE
Kenneth D. Schreyer, Williamsville, N.Y., assignor to Columbus McKinnon Chain Corporation, Tonawanda, N.Y.
Filed Feb. 18, 1959, Ser. No. 794,189
1 Claim. (Cl. 104—111)

This invention relates to suspension devices for conveyor track systems and more particularly to an adjustable suspension structure for overhead conveyor or trolley trackways.

A primary object of the invention is to provide an improved adjustable suspension means to act as a link between a permanent overhead support and a track hanger fitting; the suspension means comprising standardized components which may be mass-produced and may be used in a suspended track system having portions at different elevations, or in which the elevations of the track system or portions thereof may be varied as desired.

Another object of the invention is to provide a suspension system component as aforesaid which is of rugged construction and remains rigid in its adjusted position to withstand the severest forces applied thereto, such as when relatively heavy materials are being transported by the conveyor or when the conveyor is being accelerated or operated at high speed.

Other objects and advantages will appear from the detailed description hereinbelow and the accompanying drawing wherein:

FIG. 1 is a perspective view of a device of the invention;

FIG. 2 is a sectional view taken on line II—II of FIG. 1;

FIG. 3 is an elevational view of one component of the device of the invention; and FIG. 4 is a sectional view taken on line IV—IV of FIG. 3.

As illustrated in the drawing the adjustable suspension means of the invention includes an upper mounting bar 12 and a lower mounting bar 16, each having one end thereof slidably mounted in a channel member 20 which is box-shaped in section and has one side thereof slotted as indicated at 21. The upper mounting bar 12 is adapted for attachment to an overhead support (not shown) such as by a threaded portion 14 at its upper end; and is drilled and tapped near its lower end to receive a pair of cap screws 22, 22. The lower mounting bar 16 is adapted for attachment to a conveyor track or track hanger (not shown) as by means of a drilled opening 18 near its lower end, and is also drilled and tapped at its upper end to receive a pair of cap screws 22, 22.

Under the head of each cap screw 22 is mounted a conventional lock washer 24 and a specially designed serrated surface gripping washer 26. The gripping washers 26 are rectangular in plan view and are centrally apertured as indicated at 27, and are formed with serrations 28 at their inner faces. Thus, when the bars 12, 16 with their cap screws and washers mounted thereon are inserted in the channel member as shown, tightening of the cap screws 22 clamps the faces of the bars against the inside of the channel member 20 and forces the serrated gripping washers to bite into the outside face of the channel, thereby providing a firm engagement therebetween. The rectangular shapes of the gripping washers 26 provide optimum areas of contact with the channel, and provision of paired cap screw and washer assemblies with each mounting bar greatly increases the strength and rigidity of the adjustable mounting bar assembly.

Thus, it will be appreciated that the suspension device of the present invention comprises a telescopically adjustable strut member; the components of which are square-sectioned so as to provide automatic self-aligning and keying of the parts against the rotational displacements. At the same time, the parts are readily displaceable axially upon release of the clamping screws, the heads of which are disposed externally of the device for ready access by means of conventional tools. All of the parts are simple and rugged in design and adapted to be inexpensively fabricated and assembled into the self-contained unit form as illustrated by FIG. 1. Thus, chipping, storage, and general maintenance of the equipment is facilitated.

It will of course be appreciated that whereas only one specific form of the invention has been shown and described in detail, it will be apparent to those skilled in the art that the invention is not so limited but that various changes may be made therein without departing from the spirit of the invention or the scope of the appended claim.

I claim:

An adjustable mounting strut device for overhead conveyor track systems, comprising in combination;

an elongate tubular member of generally rectangular cross section, said member having a longitudinal slot in one face thereof extending from one end of the member to the other with such slot being positioned medially of said one face to form a pair of spaced, coplanar legs;

an elongate upper extension bar having means for attachment to an overhead support at its upper end and having threaded openings spaced longitudinally therein adjacent its lower end;

an elongate lower extension bar having means for attachment to track means at its lower end and having longitudinally spaced threaded openings therein adjacent its upper end;

the lower end of said upper extension bar and the upper end of said lower extension bar being slidably received in the opposite ends of said tubular member and each extension bar having a flat face for bearing against the inner surfaces of said legs;

fastening means engaged in the threaded openings of said extension bars; and a washer carried by each fastening means, each washer having a flat, horizontally serrated inner face so that said legs are sandwiched between the extension bars and the serrated inner faces of said washers.

References Cited in the file of this patent
UNITED STATES PATENTS

| | | |
|---|---|---|
| 575,542 | Brooks | Jan. 19, 1897 |
| 1,014,554 | Zent | Jan. 9, 1912 |
| 1,566,037 | Nelles | Dec. 15, 1925 |
| 1,643,749 | Northmore | Sept. 27, 1927 |
| 1,652,677 | McCoy et al. | Dec. 13, 1927 |
| 1,846,178 | Bergren | Feb. 23, 1932 |
| 2,041,809 | Bernhard | May 26, 1936 |
| 2,157,648 | Chason | May 9, 1939 |
| 2,345,650 | Attwood | Apr. 4, 1944 |
| 2,481,581 | Ehnhuus | Sept. 13, 1949 |
| 2,737,268 | Smith | Mar. 6, 1956 |

UNITED STATES PATENT OFFICE
CERTIFICATE OF CORRECTION

Patent No. 3,059,589            October 23, 1962

Kenneth D. Schreyer

It is hereby certified that error appears in the above numbered patent requiring correction and that the said Letters Patent should read as corrected below.

In the grant, lines 2 and 3, for "assignor to Columbus McKinnon Chain Corporation, of Tonawanda, New York," read -- assignor to Columbus McKinnon Corporation, a corporation of New York, --; line 12, for "Columbus McKinnon Chain Corporation, its successors" read -- Columbus McKinnon Corporation, its successors --; in the heading to the printed specification, lines 3 to 5, for "assignor to Columbus McKinnon Chain Corporation, Tonawanda, N. Y." read -- assignor to Columbus McKinnon Corporation, a corporation of New York --.

Signed and sealed this 16th day of April 1963.

(SEAL)
Attest:

ERNEST W. SWIDER            DAVID L. LADD
Attesting Officer            Commissioner of Patents